G. W. BRUCE.
POTATO HARVESTER WITH SIDE TRUCK.
APPLICATION FILED MAY 29, 1911.

1,019,754.

Patented Mar. 12, 1912.

WITNESSES:

A. E. Carlsen.
M. M. Carlsen.

INVENTOR:
George W. Bruce
BY his ATTORNEY:
A. M. Carlsen.

COLUMBIA PLANOGRAPH CO., WASHINGTON, D. C.

UNITED STATES PATENT OFFICE.

GEORGE W. BRUCE, OF LARIMORE, NORTH DAKOTA.

POTATO-HARVESTER WITH SIDE TRUCK.

1,019,754.  Specification of Letters Patent.  Patented Mar. 12, 1912.

Application filed May 29, 1911. Serial No. 630,215.

*To all whom it may concern:*

Be it known that I, GEORGE W. BRUCE, a citizen of the United States, residing at Larimore, in the county of Grand Forks and State of North Dakota, have invented a new and useful Potato-Harvester with Side Truck, of which the following is a specification.

My invention relates to improvements in harvesters, and the object is to provide a harvester with a side truck on which to carry the products of the harvester, and to so connect and combine said side truck with the harvester frame and the draft appliance that there will be no side draft, and no undue strain on the connection between the harvester and the truck.

The invention is applicable to grain harvesters and their bundle carriers, and to various other harvesters, but especially to potato harvesters, I have therefore in the present instance illustrated the invention as applied to a potato digger.

Figure 1:
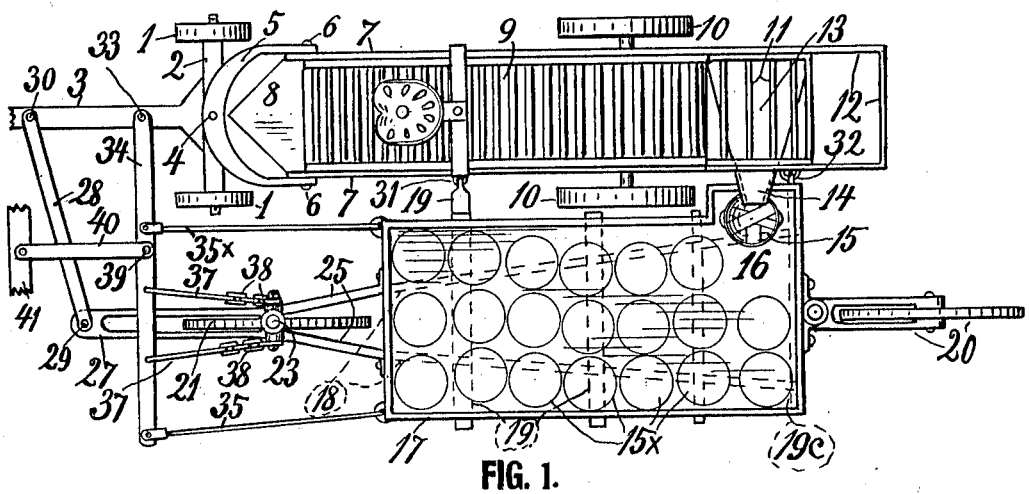
Figure 2:
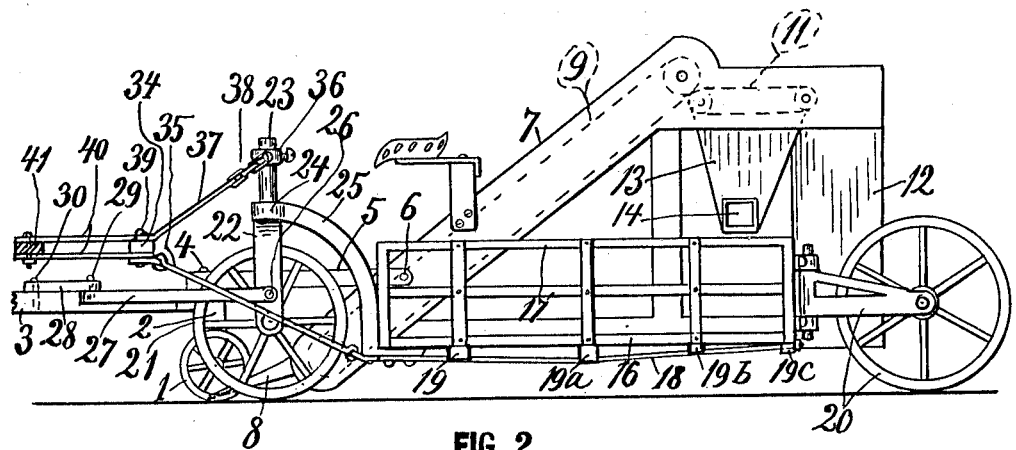

In the accompanying drawing, Figure 1 is a top view of a potato digger or harvester and a side truck for carrying the potatoes, preferably in baskets holding one bushel each. Fig. 2 is a side elevation of the truck and harvester shown in Fig. 1, with the traction wheels of the harvester omitted.

Referring to the drawing by reference numerals, it being understood that the potato digger shown has been fully described and claimed in other of my applications, one of which was filed November 25, 1910, Serial Number 594,083, I will here only state briefly, that 1, 1, designate the steering wheels, having their axle 2 provided with a pole 3, and swinging horizontally on a kingbolt 4 in a large draft clevis 5; the latter having its rear ends attached at 6 to the front end of the inclined main frame 7 of the machine. The latter may be of any of the types drawn by horses or other power, and having the front shovel 8, and rearward thereof an endless carrier 9, operated from the supporting wheels 10 by means not necessary to here show, as they are shown in said earlier application. The endless carrier 9 delivers potatoes and vines onto a second endless carrier 11, which carries the vines rearward and drops them down inside a wind-guard 12, which guard is more fully described in my other application of even date with the present one and of the Serial Number 630,214. The potatoes drop through the carrier 11 and are by a hopper 13 guided sidewise by the outlet 14 of the hopper into baskets placed like the basket 15 in the rear corner of the truck nearest to the harvester. Said truck and its connections will now be described.

The truck is composed of a floor or platform 16, which is provided with rails 17, within which to place on the platform several rows of bushel-baskets, as indicated by the circles 15× in Fig. 1, two or three baskets on the top of each other if so desired, so that the truck may carry 20 or 40 or even 60 baskets.

The platform 16 is supported by truss-rods 18 and transverse bars 19, 19$^a$, 19$^b$ and 19$^c$. The truck is supported on a rear caster 20 and a front wheel 21; the latter is journaled in a fork 22, whose stem 23 is journaled in the head 24 of a gooseneck-shaped bracket 25 projecting from the front end of the base of the truck. Pivoted at 26 to the fork 22 is a bifurcated tongue 27, which by a link-rod 28, pivoted at 29 and 30, is connected with the pole 3 at a distance from the kingbolt 4 equal to the distance between stem 23 and pivot 29, so that the wheels 1, 1 and 21 will always maintain a parallel position.

The platform of the truck is connected with the frame of the potato harvester by two eye-bolt joints 31, 32, which gives the truck a fair chance to rise and fall on uneven ground, and at the same time said joints or hinges serve to hold the truck in proper standing position although it has only one supporting wheel at each end, so as to make it ride easy. To the pole is pivoted at 33 one end of a transversely disposed horizontal evener bar 34, which is also connected with the front corners of the truck by two rods 35, 35×, and to a collar 36 on the stem 23 by two shorter brace rods 37; the latter are to support the weight of the bar 34; and to allow for variation on uneven ground, the upper ends of the rods are provided with a few chain links 38. At the center of draft, 39, the bar 34 is provided with a draw-bar, in the present instance in the form of a pair of links 40, between whose front ends is fulcrumed a main swingle-tree, 41, to which double-trees and whiffle-trees (not shown) may be attached in any desired numbers, for the application of four or 6, or any other number of horses or other draft animals. The horse or horses nearest to the pole are connected thereto, so as to steer the harvester and the truck. If instead of animals a traction engine be used, it is hitched to the bar or links 40 and at one side to the pole 3.

In the operation of the machine, while the machine is in motion and in digging contact with the ground, one person is stationed at 16 in Fig. 1, and as soon as the dug potatoes fill one basket, he removes it and replaces an empty one under the spout of the hopper, until the truck is fairly loaded; the digger and the truck are then driven beyond the soft ground of the potato field and the full baskets are unloaded into wagons hauling the potatoes to the cellar or other storing place, and the truck is supplied with empty baskets and the whole rig is hauled back to the place of operation on the field. Whether the full baskets are placed in the wagon in exchange for empty ones, or they be emptied into the wagon, is a matter of choice; at any rate, there is saving of time and labor and of injury to the potatoes, by not shoveling them from the ground; nor do the teamsters have to provide extra teams for hauling the loaded wagon over the loose soil of the potato-field, as the, usually six, horses operating the harvester do that hauling with the truck while the digger is put out of operation.

What I claim is:

1. The combination with a wheel-supported harvester having a pole and front wheels steered by the pole, of a truck hingedly attached at the side of the harvester, said truck having a single rear caster and a single front wheel supporting it, a fork journaled at the front end of the truck and having said front wheel mounted between its downward arms, a forward tongue on said fork, and a link-rod connecting the tongue with the pole.

2. The combination with a wheel-supported harvester having a pole and front wheels steered by the pole, of a truck hingedly attached at two points to one side of the harvester; a caster supporting the rear end of the truck, a fork having an upward stem journaled to the front end of the truck, and downward arms with a supporting wheel having its shaft journaled therein, a forward tongue on the fork, and a link rod connecting said tongue with the pole; a transverse evener bar connected at one end with the pole and by rods to the front end of the truck, and means on the evener bar at the center of draft for hitching thereto motive power for drawing the harvester and its said side truck.

3. The combination with a harvester and a truck hingedly attached to one side thereof, of a transverse evener bar, means connecting said evener bar with the harvester, and means connecting it also with the truck, a fork having an upward stem journaled to the front end of the truck, a supporting wheel mounted between the legs of the fork; the means connecting the truck with the evener bar involving rods extending on a slant upwardly and forwardly from the truck to the evener bar, and shorter rods connecting the stem of the fork with the evener bar, said shorter rods having means for varying their lengths, substantially as and for the purposes set forth.

In testimony whereof I affix my signature, in presence of two witnesses.

GEORGE W. BRUCE.

Witnesses:
A. STONEHOUSE,
A. P. LORD.

Copies of this patent may be obtained for five cents each, by addressing the "Commissioner of Patents, Washington, D. C."